United States Patent [19]

Shiah

[11] 3,929,962
[45] Dec. 30, 1975

[54] TITANIUM PURIFICATION PROCESS

[76] Inventor: Chyn Duog Shiah, 189 Nassau Ave., Manhasset, L.I., N.Y. 11030

[22] Filed: Aug. 29, 1972

[21] Appl. No.: 284,541

[52] U.S. Cl. ................. 423/82; 423/83; 423/612
[51] Int. Cl.² ............... C01G 23/02; C01G 23/04; C01G 23/06
[58] Field of Search ................. 423;82;83;612/

[56] References Cited
UNITED STATES PATENTS

| | | | |
|---|---|---|---|
| 1,528,319 | 3/1925 | Carteret et al. | 423/79 |
| 2,576,483 | 11/1951 | Schultz | 423/82 |
| 2,980,508 | 4/1961 | Moklebust et al. | 423/82 |
| 3,252,787 | 5/1966 | Shiah | 423/150 X |
| 3,389,957 | 6/1968 | Olds et al. | 423/79 X |

FOREIGN PATENTS OR APPLICATIONS

| | | | |
|---|---|---|---|
| 481,533 | 11/1951 | Italy | 423/83 |
| 574,818 | 1/1946 | United Kingdom | 423/612 |

OTHER PUBLICATIONS
Chemical Abstracts, Vol. 49, Col. 3769 (1955).

*Primary Examiner*—Edward Stern
*Attorney, Agent, or Firm*—Robert E. Burns; Emmanuel J. Lobato; Bruce L. Adams

[57] ABSTRACT

A process for refining titania-containing ores is described based on the increased reactivity of lower valent titanium oxides over tetravalent titanium oxides. The process includes the conversion of such titania ores, preferably beneficiated, to lower valent titanium oxides by reduction at elevated temperatures, extraction of the lower valent titanium values with HCl, oxidation of the extracted titanium values to tetravalent titanium compounds and recovery of purified $TiO_2$ from the tetravalent titanium compounds. The residue left after the extraction step may be returned to the conversion step for reduction of residual tetravalent titanium values. Traces of fluorine or hydrofluoric acid have been found to catalyze the reaction.

12 Claims, No Drawings

TITANIUM PURIFICATION PROCESS

FIELD OF THE INVENTION

This invention relates to novel processes for preparing purified $TiO_2$ and titanium tetrachloride and more particularly to processes for preparing same by a chloride process.

BACKGROUND OF THE INVENTION

Titanium dioxide ($TiO_2$) is an important industrial chemical whose most important use is as a pigment. It is also useful in the manufacture of porcelain enamels and as a component in welding rod fluxes. It also has important uses in electronic equipment based upon its electrical characteristics, particularly as a dielectric element. Recently, highly purified titanium dioxide has been subjected to carefully controlled crystallization procedures to form massive single crystals. These crystals having a rutile configuration have an exceptionally high index of refraction and gemstones cut from these single crystals are very brilliant and exhibit an unusual amount of spectral color. $TiCl_4$ is also the raw material for the preparation of titanium metal sponge as well as for the manufacture of rutile type pigments by the chloride process.

There are two commercial processes for the manufacture of titanium dioxide pigment. Until 1956, all titanium dioxide pigment was produced by the sulfate process. Ilmenite, an inexpensive ore containing about half titanium dioxide and half iron oxide, is used as the starting material. The capital cost of a sulfate process plant is very high and the sulfuric acid consumption is more than 3 tons of 100% sulfuric acid per ton of pigment produced. The tremendous quantities of waste iron sulfate and unrecoverable dilute sulfuric acid cause serious pollution problems. Because of such problems, among others, many sulfate plants have been forced to shut down by local laws or for economic reasons.

By the patented process of U.S. Pat. No. 3,252,787 to C. D. Shiah, most of the iron oxide content of ilmenite can be removed and the beneficiated ilmenite or "synthetic rutile" can be used as a raw material in the standard sulfate process plant. This minimizes the problem of iron sulfate disposal, but the question of disposal of large quantities of very diluted sulfuric acid, which cannot be economically concentrated, remains a serious handicap.

The other commercial process is the so-called "chloride process," starting with the mineral rutile. However, natural rutile reserves are limited and the price of rutile is getting higher rendering the process less economical. Much effort has been expended in making a synthetic rutile from ilmenite but only the process of the aforementioned U.S. Pat. No. 3,252,787 presently appears viable. Aside from the high cost and scarcity of the raw material, the chloride process, although involving very simple and straight-forward chemical reactions, is a rather difficult process to industrialize. The only presently successful commercial plants are using variations of the vapor phase oxidation of $TiCl_4$. Titanium tetrachloride vapor and an oxygen-containing gas are burned at elevated temperatures with the formation of a flame. The solid product of this combustion is $TiO_2$. There are serious problems including corrosion, recovery and purity. These problems seriously affect the economics of these processes. Therefore, it appears that an entirely new process for the manufacture of titanium dioxide of at least pigment grade is needed.

THE INVENTION

The present invention provides for purifying the titania-containing ores and/or sources as presently available. It is based upon an extraction, with relatively dilute solutions of aqueous hydrochloric acid, of such sources which have been pretreated by a reduction process to provide the titanium values therein at stages of oxidation below the tetravalent $TiO_2$. The invention is based upon the suprising discovery that hydrochloric acid in an aqueous solution will selectively react with appreciable amounts of the lower valent titanium compounds (titanous) and particularly the lower valent titanium oxides, at much lower temperature levels as compared with the gaseous chlorination of tetravalent titanium compounds such as titanium dioxide ($TiO_2$). Similarly, it was found that lower valency titanium oxides are more easily attacked and solubilized by aqueous dilute hydrochloric acid. Aqueous chlorination of titancus oxides yields $TiCl_4$ as the end product because the chlorine atoms present will immediately oxidize and convert titanous chlorides into titanium tetrachloride.

The lower oxides of titanium, when dissolved in dilute hydrochloric acid give titanous chloride as evidenced by the characteristic purple color in solution. Hydrous titanium oxides are precipitated from the acid solution by oxidation and hydrolysis of such solutions. Any impurities which have been dissolved by the hydrochloric acid during the initial extraction remain soluble and dissolved in the dilute acid solution while the precipitated hydrous titanium oxide is recovered at better than 98% purity and usually at about 99.5% purity. This latter, 99.5%, purity exceeds most commercial purity standards for titanium oxide pigments. The hydrous oxide can then be converted to the pigment grade $TiO_2$ by the usual treatment including calcination and grinding steps. The process of this invention may be carried out upon various starting materials including natural rutile, synthetic rutile as obtained by the process of U.S. Pat. No. 3,252,787, ilmenites such as black beach sands or ilmenite-hematites and titaniferous magnetite, naturally occurring titanium silicate, calcium titanate ores and such synthetic sources as titanium by-products as titinate tailings from the production of aluminia from bauxite and electro-smelting slags skimmed from pig iron production based upon Canadian ilmenite-hemitite ores. In all such sources the titanium is in the tetravalent state.

While the process is feasible for ores "as mined" containing as little as 15% titanium oxides (as $TiO_2$), it is preferred to start with better grade sources of about 50% $TiO_2$ content and optimally with natural rutile or synthetic rutile as obtained by the process of U.S. Pat. No. 3,252,787 which contains in excess of 90% titanium oxides (as $TiO_2$) with iron oxides comprising its major impurity.

It has been known that the various lower oxides of titanium are soluble in concentrated hot hydrofluoric acid. There has also mention been made of the solubility of such oxides in concentrated hydrochloric acid. Among these lower oxides of titanium, are titanium monoxide (TiO), titanium sesquioxide or trioxide ($Ti_2O_3$) and trititanium pentoxide, ($Ti_3O_5$). These lower oxides of titanium have usually been prepared by roasting titanium metals with titanium dioxide. It has also been known to prepare these lower oxides of titanium by other reduction means on the dioxide, for example the reduction with hydrogen at 1,200–1,500°C. Such reductions yield a mixture of the lower oxides primarily the sesquioxide but with varying amounts of TiO and $Ti_3O_5$.

The mixture of reduced lower titanium oxides, for sake of convenience herein, will be represented empirically as $Ti_2O_3$ and referred to as the trioxide or titanous oxide, has many unique properties.

1. It is easily soluble in acids, especially in the presence of certain catalytic agents, such as fluorine containing compounds.
2. Acidic solutions of titanium trichloride are not as readily hydrolyzed as titanium tetrachloride.
3. The titanium trichloride in solution can be easily oxidized to titanium tetrachloride simply by blowing it with oxygen or oxygen-containing gases, such as air, which can be subsequently or concurrently hydrolyzed to give titanium dioxide crystals of anatase or rutile structures.
4. Titanous oxide can be readily chlorinated at a much lower temperature as compared with the chlorination of titanium dioxide. The high temperature requirement for $TiO_2$ chlorination is one of the major causes of difficulty with the present chloride process for titanium dioxide pigment manufacture. Chlorination of $Ti_2O_3$ at low temperature yields titanium tetrachloride product, as the titanium trichloride that is produced, is immediately oxidized by the chlorine to the tetrachloride.

In place of the hydrogen as the reducing agent carbonatous, reducing agents such as carbon monoxide, carbon or hydrocarbons, can be used for achieving the reduction to the lower oxides. Using the carbon reducing agents it is generally required to operate at slightly higher temperatures.

It has been found that the reduction of the titanium dioxide to its lower oxides can be achieved with varying degrees of success at various temperatures at least above 900°C. When ilmenite is reduced with hydrogen at temperatures of about 1,800°F (982°C) about 25% of the titanium dioxide is converted to the lower oxides (calculated at $Ti_2O_3$). At higher temperatures greater amounts of the $TiO_2$ are converted. When operating with carbon monoxide at higher temperatures such as about 2,400°F (1,315°C), the conversion to $Ti_2O_3$ is about 40%. The reduction reaction in the case of hydrogen may be represented as follows:

$$2TiO_2 + H_2 \leftrightarrows Ti_2O_3 + H_2O$$

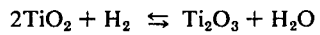
(I)

For the reduction of $TiO_2$ to $Ti_2O_3$ with carbon monoxide the probable reaction equation is:

$$2TiO_2 + CO \leftrightarrows Ti_2O_3 + CO_2$$

(II)

It is not necessary to convert all of the titanium dioxide content of the ore to the lower oxides during the initial reduction step. However, the more complete the reduction, the smaller the amount of residual tetravalent titanium dioxide that will have to be returned for further reduction treatment. Generally it is preferred to have at least 10% of the titanium oxides as the lower oxide. More preferred are lower oxide contents in excess of 25% of the titanium values and optimally at least one-third of the titanium contents should be in the form of the lower oxides. Depending upon the pretreatment of the raw material by a reduction process and with proper controls of the temperatures and times it is possible, without difficulty, to obtain material from the reduction stage having analyses at least in the more preferred range of oxide contents.

Generally, it has been found that synthetic rutile from ilmenite, wherein the iron oxide component of the ilmenite ore is selectively reduced to metallic iron and then selectively leached with ferric chloride solution, leaves a beneficiated titanium product preferable for this invention. During the course of the reduction process practiced for beneficiation according to U.S. Pat. No. 3,252,787 the conditions of temperatures can be adjusted so that the titanium oxide components of the ore can be reduced substantially to the trivalent state. Generally, the product of this reduction, carried out at temperatures in the range 900–1,500°C, utilizing hydrogen, hydrocarbons, carbon, and carbon monoxide as reducing agents, provides a beneficiated ilmenite having an analysis of at least 25% by weight of lower oxides (as $Ti_2O_3$) with at least 55% by weight of titanium dioxide. The so-treated ores are more than adequate for efficient commercial operation of the next step of the process.

According to one aspect of this invention, the product of the reduction-roasting process containing, at least 10% by weight of its titanium content in the form of lower oxides of titanium is then reacted and extracted with at least a stoichiometric quantity of aqueous hydrochloric acid solution. The hydrochloric acid should be present in the aqueous solution in a concentration of at least 10% and preferably in the range of 15–30% by weight. While hydrochloric acid is an adequate extractant for the purposes of this invention inasmuch as it efficiently dissolves the major portion of the lower oxides of titanium, it is preferred to supplement the hydrochloric acid by the addition thereto of catalytic amounts of hydrofluoric acid. The hydrofluoric acid may be generated in situ by adding 5–50% by weight (of HCl) of calcium fluoride ($CaF_2$) which in the presence of the hydrochloric acid is efficiently converted to hydrofluoric acid. The HF may, of course, be directly added to the aqueous acid solutions.

The reaction of the lower oxides with the HCl may be represented as follows:

$$Ti_2O_3 + 6HCl \leftrightarrows 2TiCl_3 + 3H_2O$$

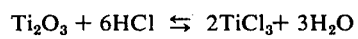
(III)

The reaction extraction, may be carried out at room temperature but at such low temperature an inordinate amount of time may be required for any substantial extraction of the trivalent titanium to be achieved. At temperatures in the range 200–235°F (95–160°C) the extraction proceeds at more economic rates. Additionally, in order to prevent loss of both the hydrochloric and hydrofluoric acid it is preferred to perform the extractions at pressures up to about 125 pounds per square inch. When operating within the above described preferred parameters of temperature and pressure, efficient extractions suitable for commercial operation of the process are obtained within time periods of 15–240 minutes. The time depends upon both the concentration of lower oxide in the feed material, the state of division of the feed material, and the pressure/temperature parameters. During this time most of the $Ti_2O_3$ and some of the unreduced titanium oxide will react and go into solution. The residue is removed by filtration. The resultant solution may then be concentrated. The degree of concentration depends upon the amount of trivalent titanium dissolved in the hydrochloric acid solution. The solution is concentrated so that preferably the titanium in the solution is calculated as $TiO_2$, is at an optimum of 70 to 150 gms/l. in the hydrochloric acid. The other soluble components such as iron, are much more soluble than the titanium trichloride, and cause no problem during this concentration stage. However, if any other impurities such as certain silicates should precipitate during this contraction step, they should be removed. It must be pointed out that this concentration step is optional and is not always preferred as the concentration of the $TiCl_3$ may have an undesirable effect upon the particle size of the product from the next step.

It is preferred to carry out this extraction stage in an inert vessel which is lined either with rubber or any other high temperature resistant non-corrosive coating or in a vessel lined with graphite or acid resistant ceramic materials. While Teflon and some of the high-temperature corrosion resisting polymers provide useful liners for vessels for carrying out this extraction step, because of their poor thermal conductivity, special provisions must be made for directly heating the contents of the vessel by means of internal corrosion resistant heat sources such as coated electrical resistance rods. By using graphiteliners, the vessels can be externally heated to achieve the temperatures required for commercially efficient extractions of the titanium oxide contents of the starting materials.

Upon completion of the extraction and the subsequent concentration, the concentrated solution is then subjected to an oxidation step which consists of contacting it with oxygen or other oxidizing materials at temperatures not above 500°F (260°C) but the range 200°–325°F (95°–155°C) is preferred. Under such conditions the titanium trichloride is converted to titanium tetrachloride. The equation for the oxidation of the $TiCl_3$ or $Ti_2O_3$ with oxygen in the presence of hydrochloric acid is as follows:

$$4\ TiCl_3 + O_2 + 4HCl \rightleftarrows 2\ TiCl_4 + 2H_2O$$
$$Ti_2O_3 + \tfrac{1}{2} O_2 + 8HCl \rightleftarrows TiCl_4 + 4H_2O \quad\quad (IV)$$

The solution is maintained at this temperature range and at pressures of up to 125 lbs/sq. inch for 2–75 minutes. Under such conditions, the titanium tetrachloride is also hydrolyzed and the hydrolyzed titanium dioxide ($H_2TiO_3$) forms a precipitate which is filtered off and treated to form $TiO_2$ according to conventional titanium dioxide manufacturing steps. The equation for the hydrolysis of the $TiCl_4$ with water is as follows:

$TiCl_4 + 3H_2O \rightleftarrows H_2TiO_3 + 4HCl$ The process for the conversion by dehydration of the hydrolyzed titanium dioxide precipitate to a pigment grade titanium dioxide product includes a calcination step of the hydrated titanium hydroxide according to the following reaction which may be represented as:

$$H_2TiO_3 + heat \rightleftarrows TiO_2 + H_2O$$

The precipitated hydrous titanium dioxide is filtered and then, subjected to a repulping operation, followed by filtration, washing, wet milling, classification, surface treatments to modify optical and performance characteristics, dry grinding, and calcining. These steps are conventional in the art of titanium dioxide pigment manufacturing and are not essential or basic to this invention. They are merely ancillary thereto when purified pigment grade titanium dioxide from the process of this invention is required.

The invention will now be further described by reference to the following specific examples of practical application, it being understood that these examples are merely illustrative, and are not to be taken as limitative of the invention.

EXAMPLE I.

RESULTS OF HCL TREATMENT

A. $1_a$ Charge: Beneficiated Ilmenite 1,040g. (reduced with hydrogen at 950°C)

ANALYSIS:

| | |
|---|---|
| FeO | 8.50% |
| $TiO_2$ | 58.50 |
| $Ti_2O_3$ | 26.00 |
| MgO | 4.64 |
| CaO | 0.20 |

$A_2$ — OPERATING CONDITIONS:

The above is heated in a non-corrosive reaction vessel maintained at 80 psig. and 312°F. for 1 hour.

$A_3$ — PRODUCTS:

$A_3(a)$ — Undissolved residue 565g.

ANALYSIS:

| | |
|---|---|
| FeO | 2.40% |
| $TiO_2$ | 88.00 |
| $Ti_2O_3$ | 3.00 |
| MgO | 0.85 |
| CaO | negligible |

(Returned to reduction process to form $A_1(a)$)

$A_3(b)$ — Mother liquor plus some wash 7 liters

ANALYSIS:

| | | |
|---|---|---|
| Total iron | 8.2 | g/l |
| $TiO_2$ | 15.0 | |
| $Ti_2O_3$ | 35.0 | |
| MgO | 6.2 | |
| CaO | 14.5 | |
| HCl (HF) | 99.5 | |

NOTE: All above are in form of chlorides and fluorides.

B. Evaporation of Mother Liquor:

| (1) Concentrated Mother Liquor | 2.3 liters | |
|---|---|---|
| ANALYSIS: | | |
| Total iron | 24.8 | g/l |
| $TiO_2$ | 45.0 | |
| $Ti_2O_3$ | 105.0 | |
| MgO | 19.0 | |
| CaO | 44.0 | |
| HCl | negligible | |
| (2) CONDENSATE | | |
| ANALYSIS: | | |
| HCl | 149 | g/l |
| Others | negligible | |

C. Oxidation & Hydrolysis of Mother Liquor:

| (1) White TiO₂ Pigment | 359.0 g. |
|---|---|
| ANALYSIS: | |
| TiO₂ | 99.95% |
| FeO | 0.05 |

NOTE: 45% yield on a single pass based upon original titanium content of starting material.

| (2) Mother Liquor after TiO₂ Removal | 3.5 liters | |
|---|---|---|
| ANALYSIS: | | |
| Total iron | 15.8 | g/l |
| TiO₂ | 0.9 | |
| Ti₂O₃ | 1.6 | |
| MgO | 12.5 | |
| CaO | 28.6 | |
| HCl + (HF) | 150.0 | |

(This was combined with the condensate above and was recycled to the HCl charge at $A_{1(b)}$ and $A_{1(c)}$.)

EXAMPLE II

COMPARISON OF RUNS WITH AND WITHOUT FLUORIDES A. Charge: (1) Beneficiated Ilmenite I 75 g.

| ANALYSIS: | |
|---|---|
| FeO | 12.80% |
| TiO₂ | 53.87 |
| Ti₂O₃ | 25.00 |
| MgO | 4.64 |
| CaO | 0.20 |
| (2) Calcium Fluoride | 25 g. |
| (3) Hydrochloric Acid, 317 g/l | 200 ml |

B. Operating Conditions:
Reflux for 4 hours at 232°F.
C. Results:

TABLE I

| Components Removed | % Removal of components | |
|---|---|---|
| | Without Fluoride | With Fluoride |
| Total iron | 42.4% | 81.6% |
| TiO₂ | 1.3 | 5.2 |
| Ti₂O₃ | 13.4 | 82.5 |
| MgO | 31.3 | 74.2 |

TABLE II

| Mother Liquor | Composition of Mother Liquor | | | |
|---|---|---|---|---|
| | Without Fluoride | | With Fluoride | |
| Total iron | 17.1 | g/l | 30.2 | g/l |
| TiO₂ | 1.0 | | 18.7 | |
| Ti₂O₃ | 48.0 | | 94.0 | |
| HCl | 145.0 | | 35.7 | |

It can be seen from example 2 that by one simple treatment more than 80% of the contained Ti₂O₃ is rendered soluble in dilute hydrochloric acid in the presence of fluorides. This dissolved portion of Ti₂O₃ will later become the major part of the pure TiO₂ pigment product. If the undissolved residue, containing predominantly TiO₂, is recycled through the reduction step once again to produce more Ti₂O₃, then more TiO₂ pigment will be produced from the titanium dioxide contained in the raw material.

It should also be noted that much of the HCl-HF mixture can be directly recovered as the condensate in the concentration step and the rest, as the mother liquor, from the hydrolysis step. The condensate may be directly recycled to the extraction step. The mother liquor acids may also be recycled directly or distilled to remove the solid impurities from the acid distillate.

It will be understood that various changes and modifications may be made without departing from the invention as defined in the appended claims and it is intended, therefore, that all matter contained in the foregoing description shall be interpreted as illustrative only and not as limitative of the invention.

I claim:
1. The method of extracting purified TiO₂ from titanium-containing ores which comprises the steps of
   a. reduction of said ores at elevated temperatures in the presence of a reducing gas, to convert at least 10 wt % of the tetravalent titanium contents of said ores to lower valent titanous compounds;
   b. extracting said lower valent titanous compounds from the so-treated ores by solution as titanous chloride in an aqueous solution of hydrochloric acid;
   c. separating the soluble titanous chloride extract from the residue;
   d. returning the residue, containing undissolved titanium compounds, for retreatment according to step (a);
   e. subjecting said separated aqueous extract, containing dissolved lower valent titanous chloride to an oxidation step to convert said titanous chloride, in solution, to titanium solutions;
   f. hydrolyzing said titanium tetrachloride solution to hydrous titanium dioxide;
   g. converting said hydrous titanium dioxide to titanium dioxide by calcination.

2. The method according to step (a) claim 1 wherein said lower valent compounds of titanium are substantially Ti₂O₃.

3. The method according to claim 1 wherein said hydrochloric acid solution contains from 10–30% by weight of HCl.

4. The method according to claim 1 wherein said HCl solution additionally contains hydrofluoric acid, and/or fluoride salts capable of generating HF in situ, a reaction promoter.

5. The method according to claim 4 wherein said hydrofluoric acid is generated by adding CaF₂ in concentrations of up to 50% by weight (as CaF₂) of said HCl.

6. A method according to claim 1 wherein said separated titanium value is oxidized at temperatures in the range 90°–160°C.

7. A method according to claim 1 wherein, the titanium tetrachloride from said oxidation is hydrolyzed at temperatures below 260°C to precipitate hydrous titanium dioxide (H₂TiO₃) from the HCl solution.

8. The method according to claim 7 wherein said oxidation and hydrolysis steps (e) and (f) are performed simultaneously.

9. The method according to claim 7 wherein said precipitated H₂TiO₃ is calcined to dehydrate and form titanium dioxide (TiO₂).

10. The method according to claim 7 wherein after said precipitated H₂TiO₃ is removed from said solution of HCl, the HCl solution is returned to said extraction step (b) for repeated extraction of said trivalent titanium compounds.

11. The method according to claim 1 wherein said starting ore is beneficiated to form a synthetic rutile.

12. The method according to claim 1 wherein said roaster reduction step a) is performed upon ilmenite ore wherein said ore is beneficiated by reducing its iron content to metallic iron and leaching said metallic iron with ferric chloride solution.

* * * * *